A. LEE.
Harrow and Cultivator Combined.
No. 203,053. Patented April 30, 1878.
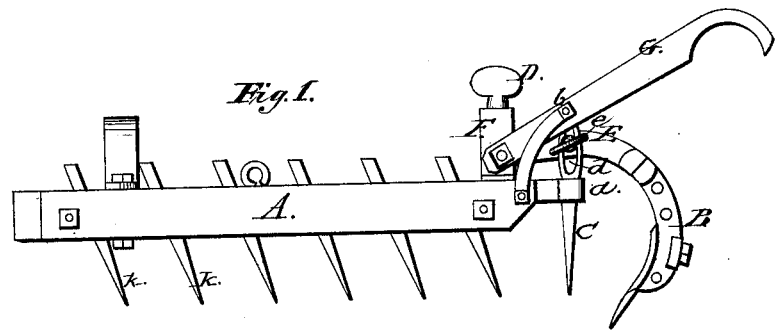
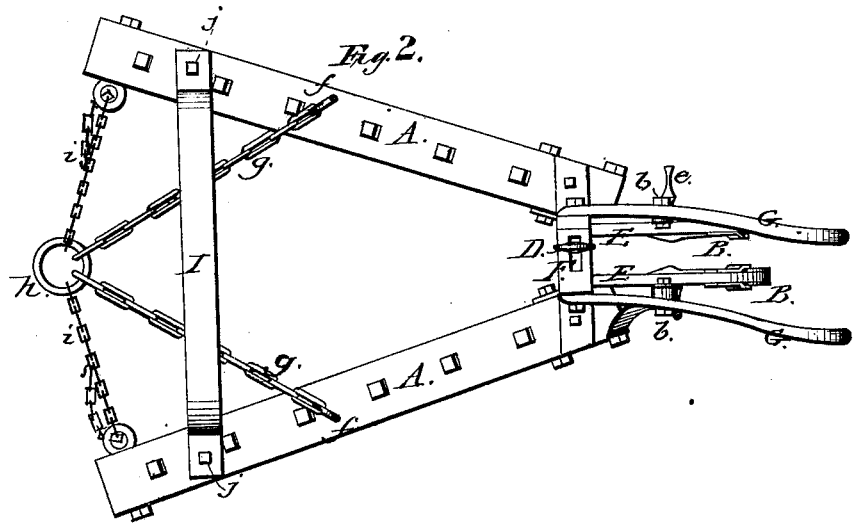

UNITED STATES PATENT OFFICE.

ALBERT LEE, OF CHARLESTON, ILLINOIS.

IMPROVEMENT IN HARROW AND CULTIVATOR COMBINED.

Specification forming part of Letters Patent No. 203,053, dated April 30, 1878; application filed January 19, 1878.

*To all whom it may concern:*

Be it known that I, ALBERT LEE, of Charleston, Coles county, Illinois, have invented a Harrow and Cultivator Combined, of which the following is a specification:

Figure 1 is a side elevation of my improved harrow and cultivator. Fig. 2 is a plan view of same.

Similar reference-letters denote like parts in both figures.

The first part of my invention consists of an attachment to the narrow end of a harrow, and, in addition thereto, of two shovels and two teeth, intended to follow after or to the rear of the harrow when in use, one of each to go on each side of the row of corn or other crops so planted, for the culture of which the improved implement is intended, the harrow, when used, to be drawn wide end foremost. They are to be adjustable as to the width that they are to run apart when operated, the small end of the harrow to be open or disjoined by a temper-screw, D, inserted in a sliding plate, F, which is attached to and secured on the top of the wooden frame A of the harrow near its narrow end. This plate is elevated above the frame, and is composed of two parts, to the perpendicular sides of which, about equidistant between the top of the wooden frame of the harrow and the top of such plates the front ends or arms E of the cultivator-shovels are attached. The two teeth, C, which are in front of the shovels, are attached, one to each side of the wooden frame of the harrow, by iron straps $a$, bolted on to the wood on the inside. These straps extend behind the ends of the wooden frame A, which are separate, and in the end of each is a square hole, through which these teeth C pass. The upper ends of the teeth are secured by bolts $b$ to the inside of the handles G of the implement. In the upper parts of these teeth are open slots $d$ or spaces, through each of which a temper-screw, $e$, passes horizontally into the front parts or arms of the shovels, so that the shovels may be lowered or elevated and held in position by these temper-screws. These shovels are in the rear of the teeth aforesaid.

The second part of my invention consists of the method of hitching to and drawing such implement. It is to be drawn by four chains, attached as follows, viz: One-third of the distance back from the wide end of the harrow, on each side, there is inserted through the wooden frame, from top to bottom, an iron bolt, $f$, secured at the bottom with a nut on a screw, with a ring or staple at the top, to each of which one end of each of the chains $g$ are secured, the front ends of which unite in a ring, $h$, at a central point at or nearly opposite the front end of the wide part of the harrow, and by two other chains, $i\ i$, uniting in the same ring, the other ends of each of which are secured by bolts similar to $f$ in the same way, inserted near each of the front ends of the wooden frame-work of the wide end of the harrow, such bolts passing from the inside to the outside laterally. The latter two chains $i\ i$ are double and adjustable, by a hook on one end of each, in order that they may be lengthened or shortened, by the shortening of which the forward end of the implement, when in use, may be elevated, and by the lengthening of which it may be lowered.

The harrow proper has ordinary pointed teeth, raking backward and secured in beams A A. The forward ends of said harrow are held together by an iron strap, I, secured by bolts $j$, nuts, &c. When the adjustments are made in the rear end of the machine, the beams A A move laterally about the bolts $j\ j$, which form the centers of motion.

What I claim as my invention, and desire to secure by Letters Patent, is—

In combination with the harrow described, the cultivator-shovels B, adjustable by means of set-screws clamped to the heads of teeth C, the handle being secured on the top of said teeth, as and for the purpose set forth.

ALBERT LEE.

Witnesses:
H. A. NEAL,
J. K. RARDIN